United States Patent [19]
Beuther et al.

[11] 3,972,831
[45] Aug. 3, 1976

[54] NITROGEN OXIDE REDUCTION SYSTEM

[75] Inventors: Harold Beuther; Thaddeus P. Kobylinski; Harold E. Swift, all of Gibsonia, Pa.

[73] Assignee: Gulf Research & Development Company, Pittsburgh, Pa.

[22] Filed: Oct. 24, 1973

[21] Appl. No.: 409,263

Related U.S. Application Data

[63] Continuation-in-part of Ser. No. 239,957, March 31, 1972, abandoned.

[52] U.S. Cl. ............................ 252/432; 423/213.5
[51] Int. Cl.² ........................................ B01J 21/02
[58] Field of Search ............... 423/213, 213.5, 214; 252/432; 106/54

[56] References Cited
UNITED STATES PATENTS

| | | | |
|---|---|---|---|
| 2,106,744 | 2/1938 | Hood et al. | 252/449 X |
| 2,315,329 | 3/1943 | Hood et al. | 252/432 X |
| 2,480,672 | 8/1949 | Plank | 252/432 X |
| 2,500,801 | 3/1950 | Church | 252/432 |
| 3,053,612 | 9/1962 | de Rosset | 423/213.5 |
| 3,189,563 | 6/1965 | Havel | 252/432 X |
| 3,619,127 | 11/1971 | Hass et al. | 252/470 |
| 3,637,344 | 1/1972 | Thompson | 252/472 |
| 3,804,647 | 4/1974 | Elmer et al. | 106/54 |

*Primary Examiner*—Patrick P. Garvin

[57] ABSTRACT

A system is proposed for the purification of exhaust gases from internal combustion engines, preferably the reduction of nitrogen oxides in exhaust gases from internal combustion engines in which nitrogen is selectively formed as substantially the only nitrogen-containing product. The exhaust gas is contacted at an elevated temperature with a noble metal in a reducing atmosphere, wherein nitrogen oxides are selectively converted to nitrogen as substantially the only nitrogen containing product, and/or is contacted with a noble metal in an oxidizing atmosphere, wherein carbon monoxide and unburned hydrocarbons are converted to carbon dioxide and water, said noble metal being distended on a microporous glass body. In a preferred embodiment the exhaust gas is contacted at an elevated temperature in a reducing atmosphere with ruthenium supported on a microporous glass body comprising a leached, phase-separated alkali borosilicate.

7 Claims, No Drawings

NITROGEN OXIDE REDUCTION SYSTEM

This application is a Continuation-in-Part application of our application Ser. No. 239,957, now abandoned, filed Mar. 31, 1972 for NITROGEN OXIDE REDUCTION SYSTEM, which application is incorporated herein by reference.

This invention relates to the selective removal of nitrogen oxides and/or carbon monoxide and unburned hydrocarbons present in exhaust gases from internal combustion engines, preferably in the selective removal of nitrogen oxides present in exhaust gases from internal combustion engines using at least one noble metal (ruthenium, rhodium, platinum, palladium, iridium and osmium) as catalyst therefor, and to a catalyst system for effecting such removal. In particular, this invention relates to the selective removal of nitrogen oxides in the exhaust gases from internal combustion engines without the formation of significant amounts of ammonia, employing a catalyst comprising ruthenium supported on a microporous glass body, particularly a leached, phase-separated, alkali borosilicate glass support having intercommunicating, submicroscopic pores.

Considerable research effort has been expended over the past several years to discover means for the removal of nitrogen oxides in the exhaust gases from internal combustion engines. Nitrogen oxides constitute an undesirable air pollutant, but the removal of these nitrogen oxides, i.e., NO and $NO_2$, has proven to be a much more difficult problem than first anticipated. These problems and some of the solutions tried are described in the Paper "$NO_x$ Reduction Catalysts For Vehicle Emission Control" by G. H. Meguerian and C. R. Lange, published by the Society of Automotive Engineers, Inc. and presented as a part of the Automotive Engineering Congress Meeting in Detroit, Michigan on Jan. 11–15, 1971. The problem is complicated by the fact that while several catalytic materials are available to convert nitrogen oxides (which are present in low concentrations in the exhaust gases from internal combustion engines) very rapidly to acceptable inert materials, such as nitrogen, most of these catalysts are active only when pure reducing agents, such as carbon monoxide, are used in an anhydrous environment. Examples of these types of materials are the transition metal oxides, which are easily poisoned by trace amounts of water. It is obvious that these catalytic materials are unacceptable for use in an automobile exhaust converter, since the automobile exhaust gases can contain up to 16 per cent water.

Noble metals, such as platinum and palladium, retain their activity for the reduction of nitrogen oxides in the presence of water; however, hydrogen as a reducing agent using platinum or palladium as the reduction catalyst proved totally unacceptable, since hydrogen was found to react with the nitrogen oxides to produce substantial amounts of unwanted ammonia. The use of carbon monoxide as a reducing agent was also found undesirable, since it reacted with water over the platinum or palladium catalyst by the well-known water gas shift reaction to given hydrogen and $CO_2$. The hydrogen would then, in turn, react preferentially with the nitrogen oxides to give ammonia. Ammonia is not only a pollutant per se, but, additionally, the ammonia, if present, would be reoxidized back to the undesirable nitrogen oxides in a second-stage reaction chamber, which would be normally employed to oxidize any unburned hydrocarbons or carbon monoxide in the exhaust gases to form $CO_2$ and water. As a consequence, the desired amount of nitrogen oxide removal could not be achieved. It was, of course, not possible to add the oxidizing gas to the first stage, since the platinum and palladium catalysts do not function to reduce NO in the presence of a predominating oxidizing atmosphere.

U.S. Pat. application Ser. No. 207,545, now U.S. Pat. No. 3,748,675, filed on Dec. 13, 1971 in the names of T. P. Kobylinski and B. W. Taylor describes a process for the selective reduction of nitrogen oxides in exhaust gases from internal combustion engines. The process involves passing an exhaust gas in contact with a catalyst bed containing specified amounts of ruthenium. The ruthenium is preferably distended upon any one of a number of supports including alumina, magnesia, thoria, titania, zirconia, silica, etc.

In a preferred embodiment we have found that substantially all of the nitrogen oxides in exhaust gases from internal combustion engines can be selectively reduced to form nitrogen as substantially the only nitrogen-containing compound, by passing the exhaust gases at elevated temperatures in a reducing atmosphere into contact with a catalyst comprising ruthenium on a microporous glass body, particularly a catalyst comprising ruthenium on a glass support characterized by a multiplicity of interconnecting, submicroscopic pores. Preferably, the glass is the insoluble or silica-rich phase obtained by leaching a phase-separated, alkali borosilicate.

The employment of the catalyst of the present invention for the selective reduction of nitrogen oxides in exhaust gases results in the formation of nitrogen as substantially the only nitrogen-containing compound and without the attendant formation of significant amounts of ammonia. As will be hereinafter demonstrated, the nitrogen oxide present in exhaust gases can be reduced to form substantially only nitrogen in the presence of hydrogen. Thus, hydrogen becomes a substantially inactive reducing agent in the presence of the microporous catalyst support of the present invention even at very high temperatures, e.g., 538° C. and above.

The catalyst support is a borosilicate glass of the following composition:

| Component | Broad Range | Weight Per Cent Preferred Range |
|---|---|---|
| $SiO_2$ | 50–98 | 80–97 |
| $B_2O_3$ | 2–18 | 3–15 |
| $K_2O$ ) $Na_2O$ ) | 0–2 | 0.3–1 |
| $Al_2O_3$ | 0–3 | 0.3–1.5 |

Other minor components, such as Fe, Li, Rb, Cs, Mg, Ca, Sr, Ba, Ti, Zn, Pb, P, Co, etc. can also be present in the above-identified borosilicate glass, if desired. The surface area of the glass is in the range of about 40 to about 300 square meters per gram, preferably about 60 to about 200 square meters per gram, with the pore radius thereof being from about 10 to about 70 A, preferably from about 16 to about 50 A. Although the glass base can be of any suitable shape, for example, in the form of glass fibers, granules, etc., preferably the glass base is in the form of spheres having a diameter of about 1/16 to about ½ inch, preferably about ⅛ to about ¼ inch.

As previously mentioned, the catalyst support of the present invention is preferably a microporous, leached borosilicate glass whose composition falls within the ranges defined above. In general, the production of the support of the present invention involves the steps of: (1) forming the catalyst support into the desired shape, e.g., spherical beads, from a parent borosilicate glass; (2) thermally treating the glass article at a selected temperature, e.g., 500° to 600° C., for a period of time, e.g., 2 to 5 hours, to separate the glass into a silica-rich phase and a silica-poor phase; (3) dissolving or leaching the silica-poor phase usually with acid to produce a porous structure composed of the silica-rich phase; (4) washing the silica-rich phase to remove leaching residue; and (5) drying.

Thus, an alkali borosilicate glass is heated to develop two separate glassy phases. One of the phases is very rich in silica, while the other phase is poor in silica, but rich in alkali and boric oxide. The silica-rich phase is termed the "insoluble phase," while the alkali-boric oxide phase has been termed the "soluble phase." The soluble phase may then be leached out of and away from the insoluble phase employing a hot acid to provide a silica-rich glass having a rigid, skeletal structure of interconnecting micropores. The resulting microporous glass can contain, for example, greater than about 90 weight per cent $SiO_2$, (usually greater than about 95 weight per cent). less than about eight weight per cent $B_2O_3$ (usually less than about four weight per cent). and less than about two weight per cent alkali metal oxide (usually less than about one weight per cent). Minor amounts (about one weight per cent) of other materials such as alumina can also be present. One method for producing such microporous borosilicate glasses is described in U.S. Pat. No. 2,106,744 to Hood and Nordberg, the disclosure of which is hereby incorporated by reference. A more recent patent disclosing the production of certain high silica, microporous glass is U.S. Pat. No. 3,602,233 to Hammel and Mackenzie, which is also hereby incorporated by reference.

The base glasses that are to be subjected to phase separation and leaching to form the microporous catalyst support of the present invention include the metal borosilicates, such as alkali metal borosilicate, alkaline earth metal borosilicates, lead borosilicate, zinc borosilicate, titanium borosilicate and the like. The weight ratio of the $SiO_2$ to $B_2O_3$ is significantly greater than about 1:1, so that upon phase separation the major phase will be the silicate phase, which will contain only minor quantities, usually less than five weight per cent, of metals, such as $Na_2O$, and other glass formers such as $B_2O_3$, $Al_2O_3$, and the like.

The preferred metal borosilicate base glasses that are to be subjected to phase separation and leaching to form the microporous catalyst supports of the present invention are the alkali metal borosilicates, for example, those containing about five to about 15 weight per cent by weight of the alkali metal oxide, about 20 to about 50 weight per cent of boron oxide ($B_2O_3$); about one to about five weight per cent of $Al_2O_3$ and about 40 to about 74 weight per cent by weight of silica.

The silica, usually $SiO_2$; boric acid ($H_3BO_3$); alkali metal, for example $Na_2CO_3$, are thoroughly admixed together with alumina ($Al_2O_3$) if employed, and melted at a suitable temperature of about 1200° C. After a suitable time for stirring and fining, the molten glass is contacted with a cool medium, such as air or water, to frit the glass into small particles to reduce the grinding time. The use of a cold stream of air is preferred as the fritting medium to prevent premature leaching of the boria.

The frit can be sieved to separate the desired size range particles. Larger particles can be crushed or ground and resieved. These particles are irregularly shaped with sharp edges in many instances. These particles can be further treated as is, or, preferably, the particles are spheroidized or beaded by any suitable means such as by passage through an inclined rotating tubular furnace. Usually the center portion of the tube furnace is heated to about 1150° C. The particles are usually admixed and coated with a material such as boron nitride to prevent the glass particles from sticking to the rotating alumina tube. The mixtures of particles and boron nitride are fed into the tube furnace at one end by means of a screw-type feeder. By proper operation, substantially all of the glass particles are beaded. Suitable inclined rotating tube furnaces are available in the industry such as Type 54233 manufactured by the Lindbergh Co., a division of Sola Basic Industries.

The preferably beaded metal borosilicate glass particles are heated, for example, at temperatures in the range of between about 450° C. and about 700° C. or higher, but below the immiscibility temperature of the glass for a period of time sufficient to form a major silica-rich phase. The time for heating will vary depending upon the particular composition and the temperatures employed. Generally, the glass can be heated to effect phase separation at the foregoing temperatures for a period of time between about one and about 20 hours, preferably between about two and about five hours. After heating, the glass can be characterized by a bluish opalescence, due to the separation of the phases.

After phase separation, the glass can be leached in any of the conventional acids, such as hydrochloric, sulfuric, nitric and the like, in order to dissolve the acid-soluble borate-rich phase and leave a skeletal glass structure of interconnecting micropores. Hydrofluoric acid should not be used, as it dissolves the silica-rich phase. The leaching can be conducted at temperatures of between about ambient temperature and about 200° C., preferably between about 90° C. and about 100° C. The acid can be employed at a concentration of between about 1N and about 3N.

The leached microporous glass particles are then thoroughly rinsed with water to remove the acid leaching medium and then dried at suitable temperatures.

The final compositions after leaching and drying generally contains greater than about 90 weight per cent silica, usually from about 95 to about 97 weight per cent silica; less than about eight weight per cent boria, usually from about one to about four weight per cent; and less than about two weight per cent alkali metal oxides, usually less than about one per cent, for example, from about 0.01 to about 0.5 weight per cent. Preferably alumina is used in the composition and the final composition usually has less than about one weight per cent alumina, for example, about 0.15 to about 0.6 weight per cent, although more can be used. It is believed the presence of alumina imparts certain desirable physical characteristics to the borosilicate beads, such as high crush strength.

If desired, the borosilicate glass can be formed in a sheet, for example, heat treated for phase separation and thereafter the phase-separated glass may be crushed, sieved and leached so that it may be employed in granular form, or the glass may be leached first and then crushed to the desired particle size.

As noted above, preferably, the catalyst support of the present invention is provided in the form of substantially spherical beads. The production of spherical glass beads can occur as noted above using the rotating furnace, or other methods wellknown in the art can be employed. Such beads can be provided, for example, by melting the base borosilicate glass prior to leaching at a temperature of, for example, 1450° C. and dispensing the molten liquid in the form of a free falling stream while still low in viscosity. The low viscosity stream is permitted to fall in space by gravity and is then contacted by a high pressure blast of fluid, such as air, steam, nitrogen, etc. In this manner, the flowing, molten glass stream is dispersed into numerous small glass beads. Exemplary apparatus previously employed in the formation of small glass beads is described in U.S. Pat. No. 2,600,963 to Bland.

As previously indicated, the microporous glass support of the present invention is provided with a noble metal catalyst. The amount of noble metal employed, calculated as metal, on the glass support can be, for example, from about 2.0 to about 0.03, preferably from about one to about 0.05, weight per cent of the glass support. The noble metal is distended on the glass support and will generally cover about 20 to about 0.3, preferably about 10 to about 0.5, per cent of the available surface area, including the pores, of the glass support. When so distended, the noble metal will form a coating on the glass support that will vary from about 10 to about one monomolecular layers in thickness, generally a coating varying from about six to about one monomolecular layers in thickness.

When the coated glass support is to be used in the reduction of nitrogen oxides in auto exhaust gases, the catalyst coating will comprise ruthenium or rhodium, especially ruthenium, wherein the amount thereof is within the limits defined above. However, best results, insofar as reduction of nitrogen oxides to nitrogen without the formation of appreciable amounts of ammonia is concerned, is obtained with ruthenium or rhodium alone, especially ruthenium alone. However, it is possible that about 50 to about 1.0 weight per cent, preferably about 2.5 to about 10 weight per cent, of the ruthenium can be replaced with platinum, palladium, iridium and/or osmium with no appreciable diminution of desired results.

When the coated glass support is to be used to convert carbon monoxide and/or unburned hydrocarbons in auto exhaust gases to carbon dioxide and water in an oxidizing atmosphere, the catalyst coating will consist of one or more of ruthenium, rhodium, platinum, palladium, iridium and osmium in any and all ratios. The amount of total metal on the glass surface will also be within the limits defined above.

It is imperative, whether the coated glass support defined herein be used under reduction conditions or under oxidation conditions to purify auto exhaust gases, that the metal used be one of the appropriate noble metals or one of the appropriate noble metal combinations defined above. The noble metals will easily coat the defined glass base within the defined limits and to form a coating within the defined thickness. It is well-known that the lowest layer of a metallic layer having a thickness of about eight monomolecular layers will be available to exert its catalytic influence on a substance in contact with the surface layer. In this way all of the noble metal on the glass surface will, at all times, be catalytically active. In addition, noble metals on the surface of the glass base herein will not migrate and will not peel off the surface of the glass.

Metals other than noble metals, on the other hand, will not cover the glass base to the same extent as the noble metals, will form large crystals which will tend to clog the pores of the glass base, and will easily flake off the surface thereof. The catalysts life of such metals will thereby be severely limited in contrast to those of the noble metals.

Any suitable method can be employed in the preparation of the supported catalyst of the present invention. For example, using ruthenium as representative of the noble metal(s) used herein, the ruthenium can be deposited on the microporous support by impregnating the support, for example, in the form of spherical glass beads, from an aqueous solution of ruthenium chloride ($RuCl_3$) using the incipient wetness technique (also commonly known as the minimum excess solution technique). Next, the catalyst can be dried and calcined in the usual manner. For example, the impregnated catalyst can be dried for six hours at 93° C. and then calcined for 12 hours at a temperature of between about 371° to about 538° C., after which it is ready for use in the process defined herein.

A definite advantage of the borosilicate glass catalyst support of the present invention is that the noble metal impregnates the glass very easily and uniformly from an aqueous solution of the salt. When a similar technique is employed with other supports, alumina for example, the noble metal tends to concentrate on the outer surface only of the alumina sphere.

The catalyst as described above is preferably employed for the selective reduction of the nitrogen oxides in exhaust gases from internal combustion engines by a process which comprises passing the exhaust gas at elevated temperatures under a reducing atmosphere into contact with the catalyst bed comprising ruthenium as defined hereinabove. Another way of stating the amount of ruthenium that will be present is to say that the amount thereof will be in the range of about 0.003 to about 0.5 Troy ounce of ruthenium, preferably about 0.008 to about 0.3 Troy ounces of ruthenium, most preferably about 0.01 to about 0.2 Troy ounce of ruthenium, per 1000 cubic feet of exhaust gas per hour. By "substantially all of the nitrogen oxides" we mean that at least about 75 mol per cent of the nitrogen oxides are converted herein, preferably at least about 85 mol per cent are converted, but most preferably at least about 90 mol per cent are converted. By "Troy ounce" of ruthenium we mean 31.1 grams of ruthenium.

The gas mixtures of interest for treatment in accordance with the process of this invention are those gas mixtures produced by the combustion of a hydrocarbon fuel using air, such as the exhaust gases from an internal combustion engine utilizing a hydrocarbon-type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhaust gases contain small concentrations of NO and $NO_2$ where usually the mol ratio of NO to $NO_2$ exceeds 1:1.

An automobile exhaust gas that can be treated in accordance with the system defined and claimed herein would have a composition whose major components would be as shown in Table I below:

Table I

| Components | | Broad Range, Mol Per Cent | Usual Range, Mol Per Cent |
|---|---|---|---|
| 1) | $NO_x$, where x is 1 or 2 | 50–5000 ppm[b] | 100–3500 ppm[b] |
| 2) | Free molecular oxygen | 0 to 5 | 0.5 to 2 |
| 3) | Free molecular hydrogen | 0.1 to 4 | 0.2 to 1 |
| 4) | CO | 0.2 to 8 | 0.4 to 2 |
| 5) | Hydrocarbons[a] | 0–4000 ppm[b] | 50–1000 ppm[b] |
| 6) | $H_2O$ | 5 to 16 | 10 to 13 |
| 7) | $CO_2$ | 5 to 16 | 10 to 13 |
| 8) | Lead (as metal) | 0 to 12 ppm[b] | 0 to 4 ppm[b] |
| 9) | Nitrogen | 53 to 99 | 68 to 78 |

[a]Calculated as carbon
[b]By volume

The composition of the exhaust can be changed within the above limits by adjustment of the carburetor to alter the air to fuel ratio.

The reaction conditions which are employed in the selective reduction of a nitrogen oxide using the ruthenium on glass catalyst of this invention are important in order to obtain a product wherein nitrogen is substantially the only nitrogen-containing product. By the statement that nitrogen is substantially the only nitrogen-containing product is meant that little or no ammonia is formed during the reduction despite the fact that the reduction occurs in the presence of hydrogen. In general, by following the procedure defined herein, no more than about 8 weight per cent of the nitrogen oxides in the exhaust gas are converted to ammonia, but in most instances less than about 5 weight per cent are converted to ammonia.

It has been found that in order to selectively reduce the nitrogen oxides in the presence of hydrogen while producing substantially no ammonia, the conditions in the reaction zone should be a temperature of about 204° to about 816° C., or even higher, preferably about 427° to about 760° C. By operating the process as defined herein, substantially all of the nitrogen oxides are converted to nitrogen and water, and only a small amount thereof is converted to ammonia. It is quite surprising that the microporous glass base, particularly the porous, leached, borosilicate support having ruthenium contained therein produces substantially no ammonia in the presence of hydrogen even at rather high temperatures.

The reaction pressure is not critical, and suitable pressures are from 0 to 150 pounds per square inch gauge (about one to about 11 kilograms per square centimeters), with the preferred pressure being atmospheric or slightly above. It has also been found that the microporous glass-supported ruthenium is an excellent catalyst at both low and high gas hourly space velocities (GHSV), i.e., at 8,000 to about 200,000, or even higher, volumes of gas per hour per volume of catalyst. In general, we prefer to operate at space velocities of about 10,000 to about 90,000. Here, as elsewhere in this specification, volumes are defined as being at standard conditions, that is, 760 mm Hg and 0°C.

In general, during idling an internal combustion engine, particularly of the automotive type, can produce as low as about 600 cubic feet per hour of exhaust gas; and at extremely high speeds, for example at speeds in excess of about 60 miles per hour, can produce as high as about 12,000 cubic feet per hour of exhaust gas, but in general from about 1500 to 8000 cubic feet per hour of exhaust gas will be produced at speeds below about 60 miles per hour. An additional critical requirement herein is to maintain an effective reducing atmosphere in the reaction zone. We have found that the concentration of molecular oxygen in the gaseous mixture being treated has no adverse effect of the ruthenium catalyst, as used herein, provided a reducing atmosphere is maintained during the reaction. By "reducing atmosphere" we mean an atmosphere wherein the stoichiometric ratio of molecular oxygen to the reducing agents in the reaction zone is less than 1:1, preferably about 0.9:1 or less. By "stoichiometric ratio of molecular oxygen to the reducing agents" we mean the amount of oxygen stoichiometrically required to convert the reducing agent or agents to their higher oxidation states. By "reducing agent" we mean to include substances which can be oxidized in the reaction zone by molecular oxygen, for example, substances such as hydrogen and carbon monoxide which can be converted to water and carbon dioxide, respectively.

The microporous glass-supported ruthenium catalyst of the present invention is, of course, primarily meant to be utilized as part of a reactor system to be attached at any suitable location in the exhaust system of an automobile. The temperature of the reactor system can suitably be regulated to the desired temperature by the position of the reactor with respect to the gases exiting from the internal combustion engine. The farther from the engine the reactor is placed, the cooler will be the gases entering the reactor. It may also be desirable to utilize some of the exhaust gases initially to preheat the reactor catalyst chamber before the gases enter into the catalyst chamber.

It is also important with automotive exhaust gases to not only remove nitrogen oxides but also to remove unburned hydrocarbons and carbon monoxide. No appreciable conversion of hydrocarbons or carbon monoxide occurs as a result of the water gas shift reaction under the reducing atmosphere employed herein during treatment of the exhaust gases with ruthenium in accordance with the process defined and claimed herein. The removal of the unburned hydrocarbon and carbon monoxide can easily be achieved by an oxidation reaction using the glass base containing one or more of the noble metals ruthenium, rhodium, platinum, palladium, iridium and osmium, all as defined hereinabove, under known oxidizing conditions. This oxidation must occur, however, in the substantial absence of ammonia, since ammonia will quickly reoxidize to form undesirable nitrogen oxides. By the use of the microporous glass-supported ruthenium catalyst of the present invention, utilizing the conditions as set forth herein, to obtain a product having substantially no ammonia, the product gases can then be oxidized in a second-stage converter utilizing the glass base containing the noble metal(s) defined above under oxidation conditions to oxidize any unburned hydrocarbons and carbon monoxide to non-polluting gases such as carbon dioxide and water. Usually combustion air is pressurized into the $NO_x$-free gases at a flow rate such that the average temperature of the catalyst bed is maintained at a level from about 427° to about 927° C., preferably a temperature of about 482° to about 593° C.

The invention will be further described with reference to the following experimental work.

For comparative purposes, two different types of microporous, leached, phase-separated borosilicate glass beads were impregnated employing an aqueous solution of ruthenium chloride ($RuCl_3$) and utilizing the incipient wetness technique. Sufficient aqueous salt solution was employed to deposit 0.2 per cent by weight of ruthenium on the Type B beads. The beads were dried at 121° C. and 460° C. and were reduced in hydrogen for three-quarters of an hour at 460° C. The characteristics of each type of glass bead prior to impregnation are set forth below in Table II.

Table II

| Properties | Type A | Type B |
| --- | --- | --- |
| Surface Area | 152 m²/g | 185 m²/g |
| Pore Volume | 0.15 cc/g | 0.46 cc/g |
| Average Pore Radius | 19.8 A | 49.6 A |

The Type A beads were made as follows:
1. 1655 grams of $SiO_2$, 1083 grams of $H_3BO_3$, 312 grams of $Na_2CO_3$ and 50 grams of $Al_2O_3$ were thoroughly mixed and melted at 1350° C. in a six-inch Lava crucible. The total melting time, which included stirring and fining, was six hours. The composition (weight per cent) was 66.2 $SiO_2$, 24.5 $B_2O_3$, 7.3 $Na_2O$ and 2.0 $Al_2O_3$.
2. The molten glass was poured into water to produce frit which reduced grinding time. 3. The frit was sieved and the fraction between numbers 5 and 10 sieves was collected. The smaller particles were collected and saved for making smaller beads. The larger particles were passed through a jaw crusher for very large pieces and a roll crusher for smaller pieces. Again the fraction between numbers 5 and 10 sieves was collected and the process repeated.
4. The particles ~ 2 to 4 millimeters in size, were spheroidized in an inclined rotating tube furnace. The center portion of the tube furnace was at approximately 1150° C. To prevent sticking to the alumina tube, the particles were mixed with boron nitride (BN) in the ratio of one part by volume of BN to 15 parts by volume of glass, or one part BN to 74 parts glass by weight. This mixture was fed into the tube furnace at one end by means of a screw type feeder. No sticking was encountered, and better than 95 per cent of the particles were beaded.
5. The beads were then placed in a ceramic tray and heat treated at 560° C. for four hours. The bead composition was now separated into a silica-rich and borate-rich phase.
6. The beads were next leached in a reflux flask using 3N HCl at 95° C. for 30 hours. After the beads were completely leached, they were rinsed in water to remove the HCl from the pores.
7. The beads were dried after rinsing at 95° C.

The composition, after leaching, rinsing and drying was, in weight per cent, 96.1 $SiO_2$; 3.48 $B_2O_3$; 0.31 $Al_2O_3$; and 0.04 $Na_2O$.

The beads were 2 to 4 millimeters in diameter. The surface area after 16 hours at 850° C. was 86 m²/g showing the thermal stability of the beads.

The Type B beads were made in a manner similar to the preparation for the Type A beads, as follows:
1. 1350 grams of $SiO_2$, 2300 grams of $H_3BO_3$, 395 grams of $Na_2CO_3$ and 120 grams of $Al_2O_3$ were thoroughly mixed and melted at 1400° C. for 1 hour and stirred at 1400° C. for one-half hour. Then the temperature was lowered to 1150° C. and stirred and fined for 3½ hours. The composition (weight per cent) was 45.0 $SiO_2$, 43.3 $B_2O_3$, 7.7 $Na_2O$ and 4.0 $Al_2O_3$.
2. The glass was fritted by blowing a cold stream of air on the glass as it was poured from the crucible.
3. The frit was sieved and the fraction between numbers 5 and 18 sieves was collected. The smaller particles were collected and saved for making smaller beads. The larger particles were passed through a jaw crusher for very large pieces and a roll crusher for smaller pieces. Again the fraction between numbers 5 and 18 sieves was collected and the process repeated.
4. The particles, ~2 to 4 millimeters in size, were spheroidized in an inclined rotating tube furnace. The center portion of the tube furnace was at approximately 1050° C. To prevent sticking to the alumina tube, the particles were mixed with boron nitride in the ratio of one part by volume of BN to 15 parts by volume of glass, or one part BN to 74 parts glass by weight. This mixture was fed into the tube furnace at one end by means of a screw type feeder. No sticking was encountered, and better than 95 per cent of the particles were beaded.
5. The beads were then placed in a ceramic tray and heat treated at 500° C. for 64 hours. The bead composition was now separated into a silica-rich and borate-rich phase.
6. The beads were next leached in a reflux flask using 1N HCl at 95° C. for 64 hours. After the beads were completely leached, they were rinsed in water to remove the HCl from the pores.
7. The beads were dried after rinsing at 95° C.

The composition after leaching, rinsing and drying was not analyzed.

The beads were 1 to 5 millimeters and the surface area after 16 hours at 850° C. was 126 m²/gram showing the thermal stability of the beads.

Various runs were made employing Type A and Type B catalyst prepared above in which the following gaseous mixtures were passed thereover to reduce the NO content thereof: (1) 1.5 volume per cent NO, 4.5 volume per cent $H_2$ and the remainder argon; (2) 1.5 volume per cent NO, 4.5 volume per cent CO and the remainder argon; (3) 1.5 volume per cent NO, three volume per cent CO, 4.5 volume per cent $H_2$ and the remainder argon; (4) 1.5 volume per cent NO, 4.5 volume per cent CO, 3.0 volume per cent $H_2O$ and the remainder argon; and (5) an exhaust gas mixture from a 315 cubic inch Chevrolet engine containing the following components:

| Components | Volume Per Cent |
| --- | --- |
| CO | 1.9 |
| $H_2$ | Approximately 0.63 |
| $H_2O$ | Approximately 11 |
| $CO_2$ | 14.55 |
| Unburned hydrocarbons | 1600 ppm |
| $O_2$ | 0.15 |

The reducing element in each of the above mixtures were respectively as follows: (1) $H_2$, (2) CO, (3) CO and $H_2$, (4) CO and $H_2O$ (through water gas shift reaction CO and $H_2$ and (5) CO, $H_2O$ and $H_2$. All of the gas mixtures were passed over the catalyst at a gas hourly space velocity of 20,000 except for the auto gas mixture which was passed over the catalyst at a gas hourly space velocity of 56,000. The amount of metal in Troy ounces per 1000 cubic feet of exhaust gas per hour in the runs herein set forth was determined in accordance with the following equation:

$$\frac{\text{Weight Per Cent Metal on Support} \times 1000}{\text{GHSV} \times \text{Factor}}$$

wherein the Factor is determined in accordance with the following equation:

$$\frac{31.1}{\text{Density of Catalyst} \times 10 \times 28.31}$$

the number 31.1 being the number of grams, in this case ruthenium, in one Troy ounce, 28.31 being the number of liters in one cubic foot of gas, the GHSV is expressed in liters of gas per liter of catalyst per hour (measured at 0° C. and 760 mm Hg) and the density is defined in grams/cc.

This simplifies to:

$$9,099.7 \times \frac{\text{Weight Per Cent Metal} \times \text{Density}}{\text{GHSV}}$$

where the Weight Per Cent Metal is the weight per cent metal on the catalyst as the percentage figure and not expressed as a weight fraction. The products were analyzed to determine the per cent selectivity of nitrogen oxide to ammonia conversion. The results are summarized below in Table III.

tively low temperature level is needed to obtain the desired results. It was unexpected to find that the temperature of NO reduction with CO as a sole reducing agent was significantly lower than that when $H_2$ was used. Runs where both CO and $H_2$ (CO + $H_2O$) were used showed reduction of NO at similarly low temperatures to that when CO only was employed. This plus lower amounts of $NH_3$ formed in those rings indicate that Ru-glass catalyst selectively catalyzed NO + CO reaction (no $NH_3$ can be formed) even when $H_2$ is present in the system. This was an unexpected and unique phenomenon for this system: Ru on glass.

The use of the catalysts herein to oxidize undesirable components in a gaseous mixture is illustrated by the following:

Run No. 15

A feed containing 1.2 volume per cent CO, 1.0 volume per cent $O_2$ and the remainder argon was passed over the following catalysts: gamma alumina beads having a diameter of three millimeters, a surface area of 186 m² per gram and microporous glass beads defined as Type A above, having distended thereon 0.1 weight per cent of platinum and gamma alumina support having distended thereon 0.15 weight per cent of platinum, at a gas hourly space velocity of 36,000. Under these conditions 0.019 Troy ounce of platinum was used per 1000 cubic feet of gas being treated per hour. The results are tabulated below in Table IV.

Table IV

| Support | Catalyst | Per Cent CO Converted | Minimum Temperature Required To Obtain 100 Per Cent Conversion Of CO, °C. |
|---|---|---|---|
| Alumina Glass Beads | Pt | 100 | 270 |
| Type A | Pt | 100 | 230 |

Table III

| Run No. | Catalyst Type | Troy Ounce Of Ruthenium Per 1000 Ft³ Of Gas Treated | Weight % Ruthenium On Catalyst | Reducing Agent In Gas Being Treated | Weight % NO Converted | Temp. In °C. Required To Obtain Such Conversion | Weight % NO Converted to $NH_3$ |
|---|---|---|---|---|---|---|---|
| 1 | A | 0.105 | 0.3 | $H_2$ | 87 | 516 | 2.0 |
| 2 | A | 0.105 | 0.3 | $H_2$ | 99 | 550 | 2.0 |
| 3 | A | 0.105 | 0.3 | CO | 87 | 313 | 0 |
| 4 | A | 0.105 | 0.3 | CO | 100 | 330 | 0 |
| 5 | A | 0.105 | 0.3 | CO + $H_2$ | 87 | 321 | 0 |
| 6 | A | 0.105 | 0.3 | CO + $H_2O$ | 99 | 344 | 0 |
| 7 | B | 0.035 | 0.1 | $H_2$ | 87 | 504 | 3.1 |
| 8 | B | 0.035 | 0.1 | $H_2$ | 99 | 532 | 2.3 |
| 9 | B | 0.035 | 0.1 | CO | 87 | 292 | 0 |
| 10 | B | 0.035 | 0.1 | CO | 99 | 318 | 0 |
| 11 | B | 0.035 | 0.1 | CO + $H_2$ | 87 | 295 | 0.5 |
| 12 | B | 0.035 | 0.1 | CO + $H_2O$ | 99 | 340 | 0.8 |
| 13 | A | 0.011 | 0.09 | CO, $H_2O$ and $H_2$ (Auto Exhaust Gas) | 82 | 350 | 0.5 |
| 14 | A | 0.011 | 0.09 | CO, $H_2O$ and $H_2$ (Auto Exhaust Gas) | 97 | 390 | 0.4 |

The uniqueness of microporous glass body carring ruthenium for treating exhaust gases from an auto exhaust gas is apparent from a study of Table III above. It is apparent that in all cases, whatever the reducing agent happens to be, that substantially all of the nitrogen oxide can be converted without the formation of any significant amount of ammonia. It will be noted, however, that when such catalysts are used to treat nitrogen oxides in auto exhaust gas, surprisingly a relatively low temperature level is needed to obtain the Note that when the microporous glass beads defined herein are employed as catalyst support there is a marked reduction in the temperature required to obtain 100 per cent conversion of CO even when the weight per cent of platinum on the support is lower than that on alumina.

The glass beads defined herein are far superior to normal supports in active use, as shown by the following. Air at an elevated temperature and at a gas hourly space velocity of about 56,000 was passed over 500 cc of several supports for a period of 24 hours to determine whether they would be able to stand up under simulated treating gas for removing impurities therefrom. The results are set forth below in Table V.

Table V

| Base Material | Packing Before | Packing After | Volume After Test, CC | Comments |
|---|---|---|---|---|
| Glass Beads, Type A | Tight | Tight | 496[a],[b] | Excellent Appearance |
| Al$_2$O$_3$ as defined in Table IV | Tight | Loose | 205[a] | Test terminated after 16 hours due to attrition |
| Pyrex Glass Beads | Tight | Loose | 480[a] 460[b] | Visible shrinkage and indentations and cracks |
| Pyrex Fabric | Tight | | Tests terminated almost immediately due to obstructed gas flow. | |
| Quartz Fabric | Tight | | | |

[a] = 593°C.
[b] = 793°C.

The above clearly shows the unexpected superiority of the glass supports herein for use in treating auto exhaust gases.

Although the invention has been described in considerable detail with particular reference to certain preferred embodiments thereof, variations and modifications can be effected within the spirit and scope of the invention as described hereinbefore, and as defined in the appended claims.

We claim:

1. A microporous glass body suitable for converting nitrogen oxides in auto exhaust gases at low temperatures without the formation of appreciable amounts of ammonia carrying substantially solely ruthenium, said glass body consisting essentially of the following composition:

| Component | Weight Per Cent |
|---|---|
| SiO$_2$ | 80–97 |
| B$_2$O$_3$ | 3–15 |
| K$_2$O  Na$_2$O | 0.3–1 |
| Al$_2$O$_3$ | 0.3–1.5 | wherein the surface area of said glass body is in the range of about 40 to about 300 square meters per gram, with the pore radius thereof being from about 10 to about 70 A, the ruthenium being distended on said glass body and covering about 20 to about 0.3 per cent of the surface thereof with a thickness of about 1 to about 10 monomolecular layers of said metal.

2. The glass body of claim 1 wherein the surface area of the glass body is in the range of about 60 to about 200 square meters per gram.

3. The glass body of claim 1 wherein the pore radius is within the range of about 16 to about 50 A.

4. The glass body of claim 1 wherein the glass body is spherical and has a diameter of about 1/16 to about ½ inch.

5. The glass body of claim 1 wherein the glass body is spherical and has a diameter of about ⅛ to about ¼ inch.

6. The glass body of claim 1 wherein the weight per cent of metal on the glass body is in the range of about 0.03 to about 2.0.

7. The glass body of claim 1 wherein the weight per cent of metal on the glass body is in the range of about 0.05 to about one weight per cent.

* * * * *